United States Patent [19]
Panaroni et al.

[11] Patent Number: 6,165,397
[45] Date of Patent: Dec. 26, 2000

[54] METHOD FOR MAKING TIRES AND THE LIKE

[75] Inventors: Vincent F. Panaroni, Sringfield, N.H.; Richard A. Steinke, Boulder City, Nev.; Dennis S. Chrobak, Silver Lake, Ohio

[73] Assignee: American Mobility Limited, Ravenna, Ohio

[21] Appl. No.: 09/274,818

[22] Filed: Mar. 19, 1999

Related U.S. Application Data

[60] Division of application No. 08/904,674, Aug. 1, 1997, Pat. No. 5,906,836, which is a continuation-in-part of application No. 08/562,838, Nov. 27, 1995, abandoned.

[51] Int. Cl.$^7$ .................................................. B29C 44/06
[52] U.S. Cl. ........................... 264/45.5; 264/45.7; 264/54
[58] Field of Search ................................. 264/45.7, 46.9, 264/45.5, 54

[56] References Cited

U.S. PATENT DOCUMENTS

| | | | |
|---|---|---|---|
| 1,260,384 | 3/1918 | Huebner | 264/46.9 |
| 3,331,423 | 7/1967 | Guin | 264/45.7 |
| 3,396,773 | 8/1968 | Alderfer | 264/45.7 |
| 4,060,578 | 11/1977 | Kisbany | 264/46.9 |
| 4,248,811 | 2/1981 | Doyle et al. | 264/46.9 |
| 4,588,542 | 5/1986 | Pierce | 264/46.9 |
| 4,909,972 | 3/1990 | Britz | 264/46.9 |
| 5,229,047 | 7/1993 | Becker | 264/45.7 |

FOREIGN PATENT DOCUMENTS

| | | | |
|---|---|---|---|
| 672372 | 5/1952 | United Kingdom | 264/46.9 |

*Primary Examiner*—Allan R. Kuhns
*Attorney, Agent, or Firm*—M. Reid Russell

[57] ABSTRACT

A method of manufacture for producing a molded article from a polyurethane material, utilizing a spin casting apparatus, preferably a non-pneumatic tire, where a mold that is formed in sections or halves and has an inner cavity formed to have the shape of the article to be manufactured and is separable to release that article after manufacture. The mold is secured to a support plate of the apparatus that is journaled to turn axially imparting a centrifugal force into the mold. The support plate is connected to or is arranged to be connected to a motor assembly for turning, and includes a clamping arrangement for maintaining the mold halves together on the support plate. An annular trough is formed in the mold immediately adjacent to a mold interior cavity inner circumference to receive a polyurethane material liquid passed thereto, and to, in turn, pass that liquid through a trough annular opening or ports into the mold cavity. The polyurethane material is selected to begin to react, forming a foam, as support plate turning is initiated, providing immediate centrifugal forces into the material to uniformly distribute it throughout the mold cavity, compacting it against the cavity walls to form an article having a uniformly increasing porosity from a dense outer circumference to its inner circumference. The preferred polyurethane material used in the process is a composition of polyisocyanates, with water as a polyol, and preferably includes a blowing agent to produce carbon dioxide gas during curing and provides for, after mixing, a time delay in seconds to allow the mixture to fill the mold annular trough and at least partially travel into the mold cavity, before the mixture begins to react.

6 Claims, 6 Drawing Sheets

METHOD FOR MAKING TIRES AND THE LIKE

This is a division of application Ser. No. 08/904,674, filed Aug. 1, 1997, U.S. Pat. No. 5,906,836 which application is a continuation-in-part application of prior application Ser. No. 08/562,838, filed Nov. 27, 1995, now abandoned.

BACKGROUND OF THE INVENTION

1. Field of the Invention

This invention relates to the apparatus and method for processing polyurethane foams to form bicycle tires and the like.

2. Prior Art

For a number of years polyurethane foams have been used to produce products having outer integral skins that surround or partially surround a foam core. In such earlier developments, it has been recognized that bicycle and wheelchair tires can be, and in practice have been, produced from such foams to have an outer integral skin, and a foam core. Such products have gained acceptance because they give a ride that is rather comparable to pneumatic tires while not being subject to air loss, blow outs, and the like. Examples of such earlier developments are shown in U.S. patents of two of the inventors, U.S. Pat. Nos. 4,943,223 and 4,855,096, that the apparatus and method of the present invention improves upon to provide a tire of consistent quality with an appropriate density, and of minimum weight and resistance to rolling.

The present invention, unique from earlier technology, provides an apparatus and method that is useable for the production of non pneumatic tires and other products that will have a uniform density variability from the outer circumference to the inner diameter, providing ride comfort that is comparable to that of a pneumatic tire with greater wear life than pneumatic tires and is not subject to puncture or blow out.

In the past, solid and cellular polyurethane tires, semi pneumatic polyurethane tires, solid rubber tires and solid tires made from various other materials have been developed as set out in the above cited U.S. patents of two of the inventors and by others. Examples of such earlier apparatus and processes for spin casting items from liquid elastomers are shown in a number of earlier U.S. Pat. Nos. 3,200,180; 3,505,437; 3,751,551; 3,956,448; 4,049,767; 4,379,104; 4,387,070; 4,416,841; 4,472,340; 4,478,567; and 4,479,769, and in Canadian Patents No.'s 875,065 and 1,092,296. Additionally, non-pneumatic tires, and the like, preferably formed utilizing rotational or spin casting processes are shown in another U.S. Pat. No. 5,086,815 to two of the present inventors, and in U.S. Pat. Nos. 3,348,597; 3,605, 848 and Canadian Patent No. 1,032,445, with a patent to Pointer, U.S. Pat. No. 4,436,128, showing a tubeless tire that is preferably formed from a polyurethane material and includes a thermoplastic cord formed in the tire bead for reinforcing that bead that the invention improves upon by a utilization of a continuous cord fitted therein in the molding process that is preferably formed as a continuous metal wire, providing uniform support at all points around the tire bead with little or no stretch.

While the above cited prior art shows that polyurethane foams have heretofore been used for producing tires, and the like, such have not provided molded items that are free of variations in density throughout a finished product. Further, such earlier apparatus and methods have produced tires, and the like, with voids and blemishes, in the product surface, which defects have greatly limited the market acceptance of such products. Additionally, other defects that non pneumatic tires have exhibited in a use and practice of earlier apparatus and methods are addressed and solved by the present invention to include a production of a tire that will remain securely attached to the rim over time and, in use, will maintain a proper circumference during use. Further unique to the invention, a tire manufactured using the apparatus and by the process of the invention will include a center line rib to decrease resistance to rolling, and a shoulder lug and improve off road traction over earlier designs, and provides for an improvement in static spring rate by closely controlling of the density of the foam as is preferably used in the tire manufacture to dramatically improve tire spring rate and the rolling resistance. Also, as an improvement over prior tire designs, the invention addresses and solves the problem of a non reliance of the tire outer skin in relationship to its inner core by dispensing with a utilization of a skinning foam like earlier tires have incorporated, thereby yielding an improvement in cell structure and density of the molded item. A tire is thereby provided that exhibits a higher density around its outer diameter, or tread surface, as compared to a somewhat lower but controlled density around its inside diameter.

SUMMARY OF THE INVENTION

It is a principal object of the present invention to provide an apparatus and method for its use in a production by spin casting or molding methods of non pneumatic tires and other products to have a density that varies uniformly from around an outer circumference to around its inner diameter.

Another object of the present invention is to provide a non pneumatic tire that is produced utilizing the apparatus and by practicing the method of the invention that will provide the ride and comfort like that exhibited by a conventional a pneumatic tire while exhibiting a greater wear life than does such a conventional pneumatic tire and will not be subject to puncture or blow out.

Another object of the present invention is to provide an apparatus and method for producing articles from polyurethane foams to have a precalculated uniform density variation throughout the foam so as to yield an article with a finished surface that is free of voids, blemishes and other defects.

Still another object of the present invention is to provide for the manufacture of a non pneumatic tire utilizing the apparatus and method of the invention at a cost to where such a tire will compare favorably in the marketplace with pneumatic tires and other currently available non pneumatic tires.

Still another object of the present invention is to provide a non pneumatic tire utilizing the apparatus and method of the invention that will not be subject to blow outs while still providing the ride characteristics of a pneumatic tire.

Still another object of the present invention is to provide an apparatus and method for efficiently, reliably and economically producing a non pneumatic to have ride and wear characteristics that are essentially the same or better than pneumatic tires, with minimum defects, resulting in fewer rejections, and providing for a negligible waste of materials in tire manufacture.

Principal features of the apparatus of the invention include a mold holder, having an arrangement for positioning an article forming mold thereon in close proximity to a pouring machine and including a mold clamping arrangement. The mold clamping arrangement provides for joining the mold halves together with the mold centered on with the support plate to be spun. The mold containing a mold cavity is spun about a common central axis, throwing a mold material into the mold cavity. A drive motor is provided to engage a through gearing, pulleys and belt, a slave wheel, or the like, to turn the support plate and connected mold. A plurality of molds may be arranged on a common movable surface as a molding line where a number of molds are arranged, for example, on a plate to be burned in a merry go round fashion, or the like configuration each mold, in turn, to pass into alignment with a polyurethane supply head, with such system to provide improved molding efficiency. So arranged, at each molding station, a turning motor can be operated to provide a desired spinning speed for optimum spin cast of a particular item.

For the invention, a polyurethane supply head is provided that receives the components of the resinous material combined together that are then a polyurethane foam that is supplied as a metered flow for passage through the head into an annular mold transfer trough. The mold transfer trough is preferably an annular cavity that is formed around and proximate to a mold cavity and opens at an annular opening from the annular trough or at spaced ports into the mold cavity to provide for filling the mold cavity with the resinous material within a desired time period, measured in seconds. Whereafter, the mold is spun to propel and evenly distribute the resinous material throughout the mold cavity. A uniform foamed article is thereby formed that will have a well defined molded surface that is free of voids, does not have a thick skin, and will have a uniform pore distribution from its outer surface to its inner surface.

For the invention, the mold annular trough is preferably arranged in a flanged lower mold half, that is arranged to connect to an upper mold half. Whereby, when the mold halves are closed together, the trough can receive the liquid resinous material passed therein with that material passed from the mold trough into the mold cavity through the annular opening or spaced ports, with the mold to propel the resinous material throughout the mold cavity. The resinous material is preferably a liquid polyurethane mixture selected to remain in a liquid state for a sufficient time period in seconds to allow it to pass through a the annular opening or plurality of spaced ports in the mold trough and into the mold prior to and after the mold is spun. The mold annular trough is formed to encourage the mixture to flow, as by gravity, or, as required, by operation of a plunger, or like device, downwardly to the bottom of the trough to be immediately opposite the annular opening or spaced ports that open into to the mold cavity. To insure a proper polyurethane mixture flow, a low viscosity polyurethane material is preferred, with the arrangement of the mold annular trough and annular opening or spaced ports thereof further promoting a free flow of the material.

The mold annular trough is charged by a pouring machine just prior to mold spinning to provide for at least a partial travel of the polyurethane material into the mold, whereafter centrifugal forces are applied by spinning the mold, moving the polyurethane material into and filling the mold cavity. The mold annular trough is formed to provide for moving the mixture radially outward through the annular opening or spaced ports from adjacent to the mold bead forming area. The mold annular trough is adjacent to and closely proximate the mold cavity and, the annular opening or ports freely pass the material therethrough that is compacted against a mold tread forming area. The immediate travel of the resinous material at mold spin up is insured by the distance the mold annular trough is from the mold center, the resinous material to fully benefit from the applied centrifugal forces. The mold trough is preferably a continuous annular cavity but may, within the scope of this disclosure, be a series or number of like trough sections that are formed within the lower mold half, at spaced intervals around the mold cavity, that each include an annular opening or are each ported into the mold cavity, with the single annular mold trough or the mold trough sections to receive a measured amount of the polyurethane material poured therein.

In practice, preferably a single annular trough is formed around and immediately adjacent to the mold inner most circumference, to pass the resinous material through the annular opening or spaced ports that direct the resinous material across the mold bead forming area to contact the mold trend forming area. Further, as required, the mold trough, can be arranged for passing a flow of the resinous material under a low transport pressure. While the resinous material can be introduced manually, a mechanical arrangement to include an overhead arm mounting a hose or hoses that are connected to vessels containing the resinous materials is preferred and includes a pivot arrangement for mounting a nozzle or nozzle ends of the hose or hoses for positioning over the annular trough, to pass a measure volume of resinous material into the mold annular trough prior to the mold being spun.

A method of the invention for forming molded polyurethane round items, such as a tire, involves a use of polyurethane foam mixes that are formulated to provide foam cells that are projected against the surface of the host mold cavity when the mold is spun to collapse along and against the mold cavity bead or wall and the mold cavity tread surfaces. A uniform surface of molded item that is free of voids and other blemishes is thereby created under the force of the centrifugal action on the polyurethane foam to align and distribute the cells of the reacting polyurethane mixture throughout the mold. A predetermined designed alignment of the polyurethane foam wall have a controlled density variation from the outer perimeter or circumference of a cast item, such as a tire, along its side wall or bead to around its inner most diameter. A spring rate is thereby provided to the molded item that is comparable to that of a pneumatic tire. Additionally, a selection of the speed of mold rotation, in practice, further provides for a preferred polyurethane cell alignment to provide enhanced performance characteristics to the molded tire as relating to rolling resistance and spring rate. By passing an unreacted liquid polyurethane chemical mix into in the mold annular trough just prior to mold rotation the chemicals will remain stable and unreacted to just prior to mold rotation and therefore will only be influenced by the speed of mold rotation, insuring a formation of a very consistent and reliable molded product. In a practice of the method of the invention, a finished item, such as a tire, will have improved physical properties, over earlier molded items, with less waste as compared as in former process that resulted from travel hang ups of the resinous materials from the mold center outwardly at mold rotation. Heretofore, in practice, the polyurethane mixture has passed through its low viscosity state and has partially cured prior to or during transport into the mold cavity, causing a mass of atomized polyurethane particles to form a random pattern towards the outer portion of the mold, resulting in variations in the polymer that often produce an unacceptable casting. Such problems are corrected by a utilization of the apparatus of the invention and a selection of a preferred resinous material that will remain unreacted until the mold is spun up.

A preferred resinous foam mixture of the invention consists of conventional polyisocyanates and polyols and water and blowing agents can be additionally added to a water component of the mix. Further, selected silicone surfactants are preferably added to the mix to provide and maintain a fine uniform bubble dispersion throughout the mix for cell development.

While an apparatus, method and process of the invention are here disclosed as being suitable for the production of bicycle tires, it should be apparent that other items as are suitable for production by spin casting methods can be produced in the apparatus of the invention, as disclosed, by appropriately changing the shape of the cavity of the apparatus mold. Further, such items can be produced to have different or other desired characteristics from those set out above by a change in the rate of mold rotation.

BRIEF DESCRIPTION OF THE DRAWINGS

The following drawings illustrate that which is presently regarded as the best mode for carrying out the invention.

DETAILED DESCRIPTION

The present invention is directed to apparatus and a method for producing an article or articles from of a resinous material utilizing spin casting techniques, which article is shown herein as a bicycle tire, that has a conventional appearance of an air containing tire. Except, of course, the bicycle tire of the invention does not rely on air for support and for providing a desired ride quality.

Figure 5:
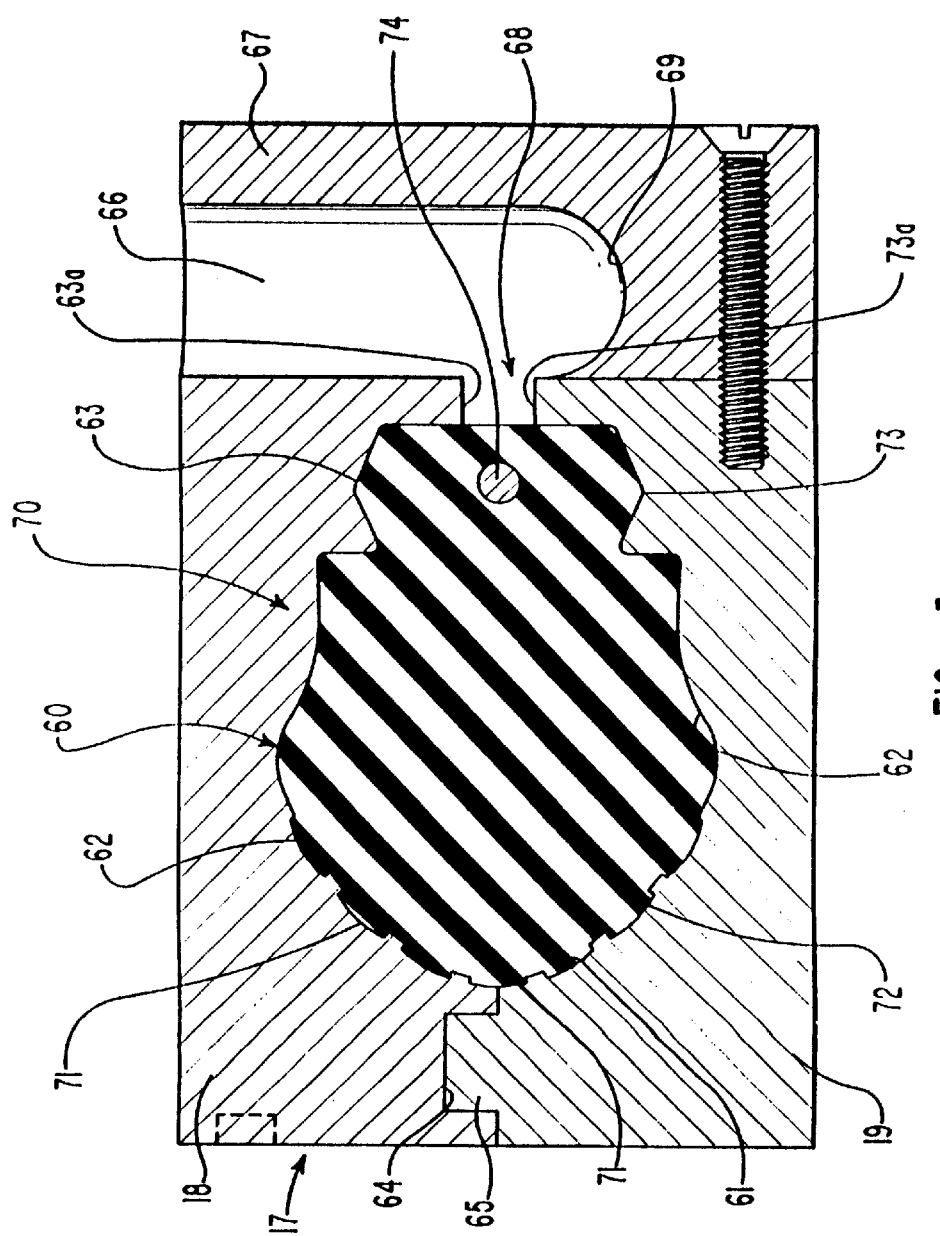
FIG. 5 is an enlarged sectional view taken across the joined mold halves, showing the mold cavity wherein a bicycle tire is formed and showing the annular mold trough as open between opposing edges of the mold halves.
Figure 7:
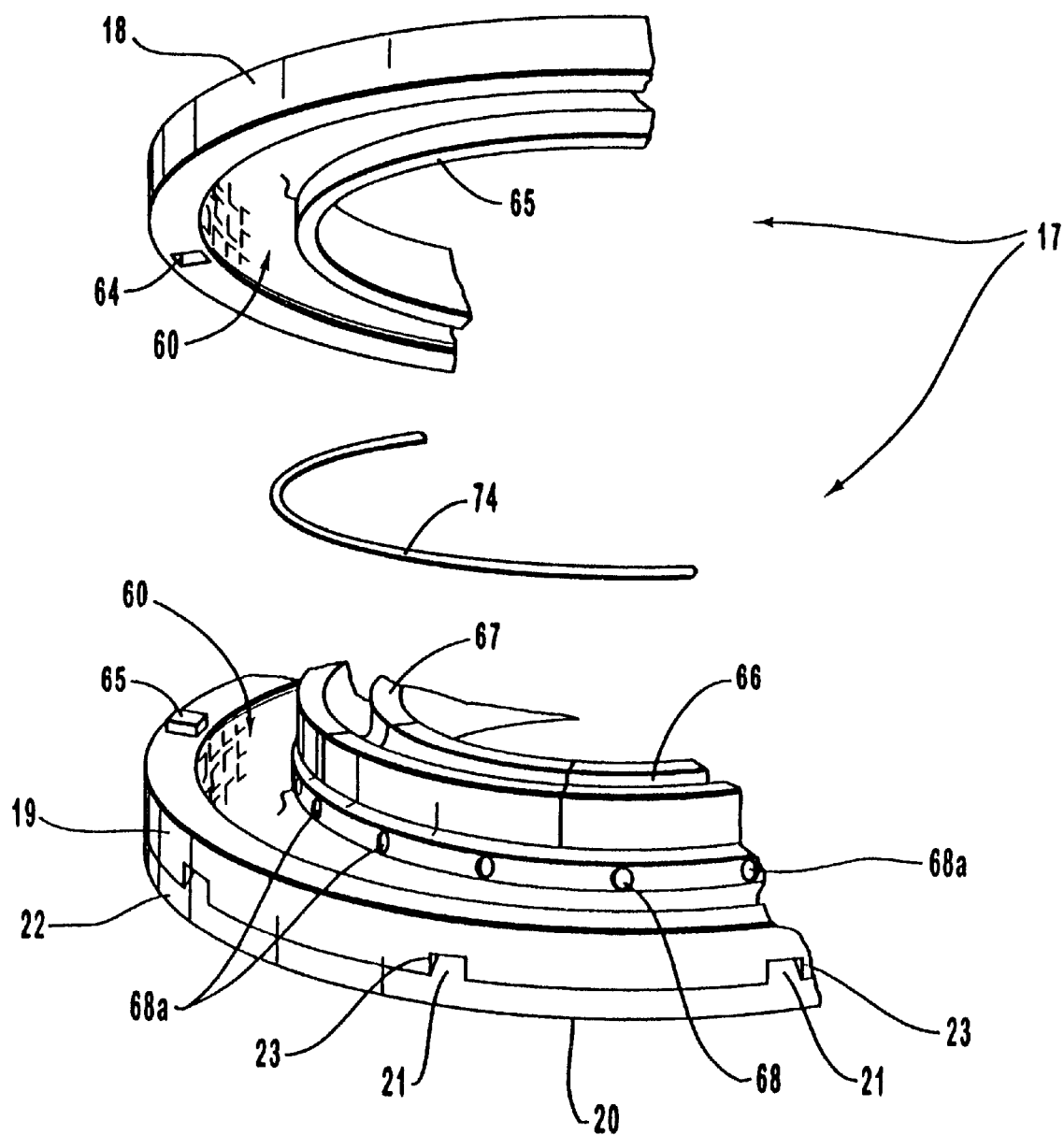
FIG. 7 is a partial perspective view of another embodiment of the mold halves of the invention shown in an open state, where an annular mold trough is shown through a plurality of spaced parts to open into a mold cavity, when the mold halves are closed together.

As in any molding process, a mold 17 is provided to accurately represent an article to be manufactured and that mold needs to be located in such a position to readily and rapidly receive a resinous material, such as a polyurethane liquid, or the like, passed into a mold cavity. Further, where molds that utilized centrifugal force to direct such resinous material into a mold cavity are employed, it is required that the resinous travel rapidly into the mold cavity to form a proper casting when the mold is spun. One such molding machine and method was earlier developed by two of the inventors and is set out in U.S. Pat. Nos. 4,835,096 and 4,943,223, for example. This apparatus provided for introducing a resinous liquid is into the mold center innermost diameter. With the mold then spun to throw the material to a mold cavity outer circumference area. When the mold is spun up, the resinous materials are subjected to centrifugal forces to throw the material outwardly into the mold. While molded items, such as bicycle tires, have been produced in such apparatus in such manufacture a large number of rejects have been produced as a result of a partial setting up of the resinous materials prior to its properly filling the mold cavity producing a molded item that does not have a uniform cross section consistency, resulting in an unbalanced finished item. These and other problems are solved by the present invention that provides, an annular trough 66 arrangement, as shown in FIGS. 5 and 7, that is immediately adjacent to an inner the item mold cavity, that will be quickly acted upon by centrifugal forces as are generated by spinning the mold 17. The annular trough 66 is arranged to be easily filled just prior to the mold spin up with the materials passed through an opening 68 between opposing mold half edges 63 and 73, as shown in FIG. 5, or trough spaced ports 68a, as shown in FIG. 7. The annular trough 66 and a fill arrangement therefore, as set out below, are both easily accessible and can be quickly cleaned after use. The mold 17 configuration of the invention also allows for a greatly reduced mold mass.

Unlike conventional apparatus and methods for producing such a molded article utilizing centrifugal force, in the present invention, the liquid composition is at least partially transferred into the mold 17, before the mold is spun up to a predetermined rate of turning. Accordingly, for the invention it is not required that the mold 17 or mold apparatus 10 be rotating at its top speed to pass the predetermined amount of chemical composition into the mold chamber. Rather, with the annular trough 66 positioned immediately adjacent to and opening directly into the mold cavity 60, at the bead forming area, the mold material will immediately be thrown into the mold cavity at the initiation of mold turning. Therefore, such mold turning can be at a lower speed than has heretofore been possible.

With annular trough 66 filling, spinning of the mold 17 is undertaken, at a predetermined rate of speed of rotation, to provide a passage of a complete charge of the chemical composition into the mold cavity 60, evenly dispersed under optimum "G" force. This dispersion is to take place prior to an appreciable chemical reaction having taken place in the chemicals.

Unlike the present invention, earlier conventional centrifugal molding apparatus have provided for an introduction of a chemical composition into the center or hub portion of the apparatus while the mold cavity is rotating. As the centrifugal or the "G" forces at the mold center or hub are, of course, essentially zero, travel of the chemical composition out into the mold will be, at best, slow and accordingly formation of a satisfactory molded item has been difficult and unreliable. Further, for such earlier apparatus, the spinning mold has created both a danger to the operator and has presented complications in the introduction of a chemical composition into the spinning mold. Such problems have included, safety concerns and misalignment between the introduction mechanism, and the receiving area of the apparatus, often causing non identical molded items to be produced. Also, a stopping of the apparatus from turning at high speed has been required with earlier apparatus, with such rapid deceleration straining the apparatus and produces a high level of wear and tear, thereby shortening the life of the apparatus. Further, with the improved apparatus of the invention, a preferred new composition of the chemicals has been developed that provides a delay in the chemical's set up time, allowing most of the chemical mix to be introduced into the mold cavity prior to spin up. So arranged, the centrifugal forces applied to the mold 17 will be fully applied to the chemicals, aligning the molecules in the material to insure that the casting will have uniform physical properties. Thereby, identical items can be consistently molded that are uniform in appearance and weight, and with such molded item having enhanced performance characteristics.

In a practice of the invention, since the chemical composition or materials will have been delivered to the mold cavity 60 without its being subjected to increasing forces as it travels to and into the mold, as would draw the chemical materials to the outer diameter of the molding cavity, a consistent reproduction of the item is reliably each time that item is molded. This is in contrast to having to move the chemical composition across a rotating receiving plate, such as shown and described in U.S. Pat. Nos. 4,943,223, and 4,955,096, where ever changing centrifugal forces are encountered as the material passes through channels of the receiving plate and enters into the mold cavity, resulting in a build up of the chemical composition, producing unwanted variations in the items being produced.

The ability to initiate a chemical reaction of the preferred polyurethane composition after it is passed into the mold cavity precludes the polyurethane material from being influenced by centrifugal forces until the polyisocyanates, polyols, water and other chemical constituents therein, that comprise the composition, are mostly physically in the mold cavity. Then, with the application of centrifugal force, that preferably takes place within the first second to the tenth of a second from when the polyurethane material is introduced into the mold cavity, the polyurethane material, begins its reaction. This results in a uniform composition of the chemicals as are subjected to rotational force, resulting in a foamed article having a well defined molded surface that is free of voids and thick skin.

Further, by a practice of the present process, a molded item or article will be produced that exhibits a decrease in density from its outer perimeter, that is in contact with the mold outer surface, inwardly to the inner area of the item. For the invention, density control is provided by a selection of water as a reactive polyol that will react with a selected polyisocyanate to create a controlled carbon dioxide gas that yields an ever declining density of microcellular cells from the item outer surface inwardly.

Figure 1:
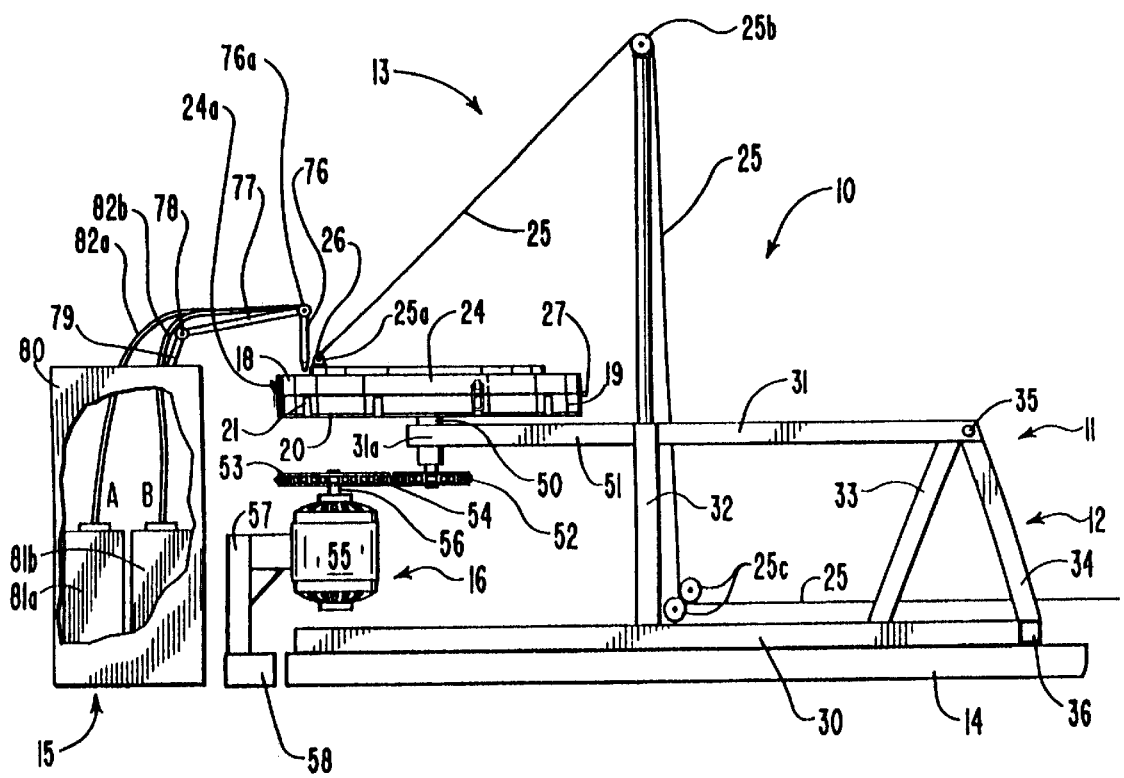
FIG. 1 is a side elevation view of the a preferred spill casting or molding apparatus of the invention with a mold for forming a tire shown closed.
Figure 2:
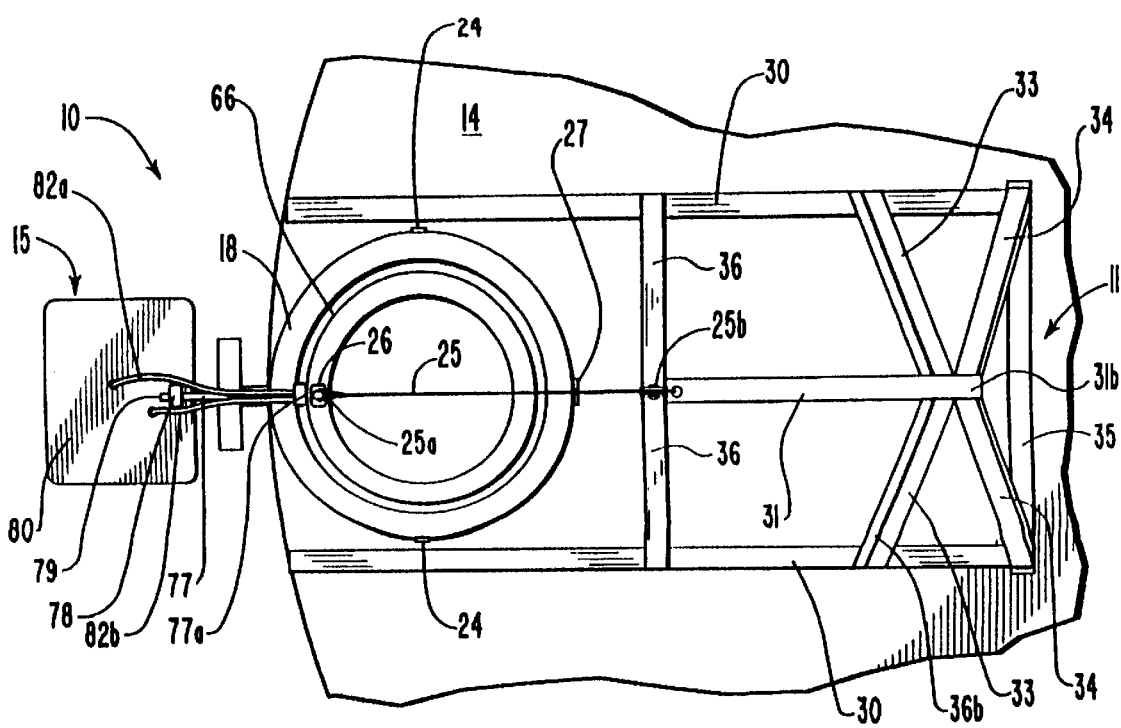
FIG. 2 is a top plan view of the apparatus of FIG. 1.
Figure 3:
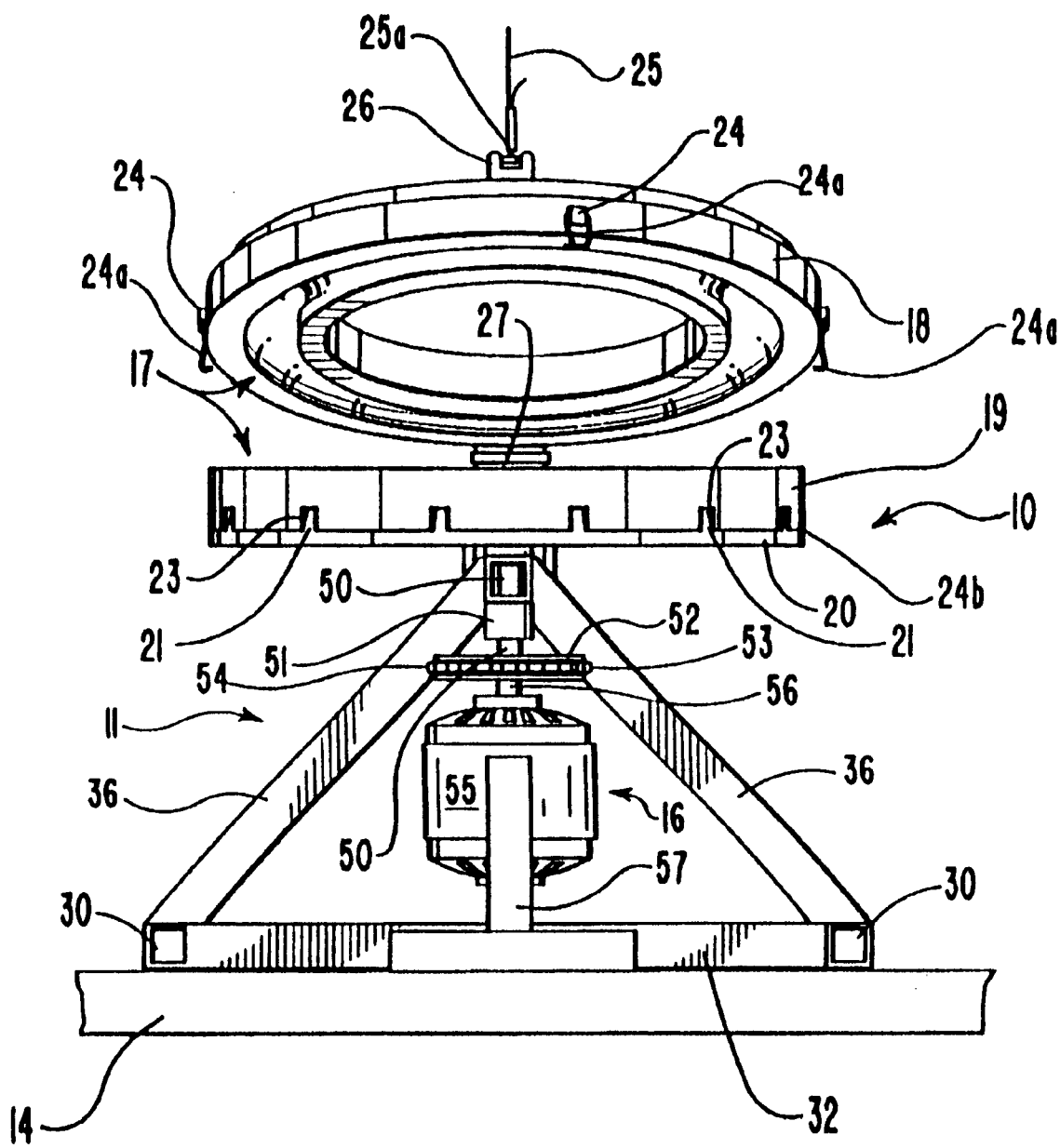
FIG. 3 is an enlarged front elevation view of the apparatus of FIG. 1 showing two mold halves in an open state.

Shown in FIGS. 1 through 3, the invention is in a mold apparatus 10, that includes a mold holder 11 and includes a support base 12 and a clamping assembly 13. Preferably, the mold holder 11, as shown best in FIG. 1, is mounted on a carousel 14, shown as a plate, and includes a drive motor assembly 16, as shown in FIGS. 1 and 2. The carousel plate is journaled to rotate axially to move mold 17 into position with a resinous material dispenser 15. The drive motor assembly 16 is preferably a single unit, is located at the resinous material dispenser 15 position and is arranged for releasable connection to turn mold 17. The mold 17, as shown in FIGS. 1 through 4 and 7, includes top and bottom sections or halves, 18 and 19, that are arranged for closing together, as set out below, with the mold bottom section or half 19 for positioning on a support plate 20. Registry of the bottom mold section or half 19 on the support plate 20, as shown in FIG. 3, is provided by at least one and preferably a plurality of tabs or fingers 21, that extend upwardly at spaced intervals from around the support plate 20 edge 22 and are for fitting into slots 23 that are formed in the outer surface of the bottom mold half 19.

Shown in FIGS. 1 and 3, the clamping assembly 13 is arranged in the mold top section or half 18 and includes a plurality of equally spaced hooks 24 that each extend from the top mold half 18 at spaced points along its lower edge that are each to engage a slot 23 that is formed in the bottom mold half 19. A hook end 24$a$ of each hook is arranged for fitting therein, providing for releasably securing the mold halves 18 and 19 together. For raising and lowering the top mold half 18 off of and onto the bottom mold half 19 a cable 25 having a hook end 25$a$, as shown in FIGS. 1, 2 and 3, is releasably coupled to an eyelet 26 that is secured to at extends upwardly from the top mold half 18, proximate to a forward edge thereof To provide for lowering the top mold half 18 onto the bottom mold half 19, as illustrated in FIGS. 2 and 3, a releasable hinge 27 is provided for hinge coupling the top and bottom mold halves 18 and 19 together, which hinge 27 consists of hinge sections each secured at an aligned point on the mold half rear edges. So arranged, by pulling cable 25 over top roller 25$b$, and between guide rollers 25$c$, as shown in FIG. 1, the top mold half 18 will be pivoted around hinge 27 to the attitude shown in FIGS. 1, 2 and 3, allowing an item formed in a mold cavity 60, formed in the mold halves, to be removed. With, when the hook 24 ends 24$a$ are pulled out from the slots 23, and the releasable hinge 27 is released and the cable 25 is disconnected from the eyelet 26, the top mold half 18 can be lifted off of the mold lower half 19 for cleaning, repair, or the like. To lower the top mold half 18 onto the bottom mold half 19, the cable 25 is reeled out, lowering the top mold half into engagement with the bottom mold half. Thereafter, and prior to passing the resinous material into a mold annular trough 66, and spinning the support plate 20, as set out below, the cable hook end 25$a$ is disengaged from the eyelet 26.

The support base 12, as shown in FIGS. 1, 2 and 3, includes a box frame having a pair of parallel ground engaging legs 30 and a top support beam 31. A pair of braces 36 are connect between the legs and beam, forming triangle members, whose their base ends are secured to each ground engaging leg 30 and with the braces 36 apex ends connected to top support beam 31. The support base 12 includes a rear truss that is formed by straight sides 33 and 34 that meet at a rear end 31$b$ of top support beam 31. So arranged, lower ends of the respective vertical braces 36 and sides 33 and 34 are secured to the ground engaging legs 30, and the top support beam 31 is connected to apexes of the vertical braces 36 and sides 33 and 34. Additionally, the support base 12 preferably includes a front cross brace 32 and rear cross brace 35 that are each secured thereacross, as shown in FIGS. 2 and 3. The support base 12, in turn, is preferably mounted onto the carousel 14 to turn therewith as set out below with respect to a discussion of molding operations of the invention.

For spinning the mold 17, the support plate 20, as shown in FIGS. 1 and 3, is secured to an axle 50 located at the center of its undersurface that is journaled through a base 51 and is maintained to and is located below a forward end 31$a$ of top support beam 31, the support plate 20 to turn freely thereon. To provide support plate 20 turning, to spin the mold 1 7 as described, a gear 52 is secured across the axle 50 lower end, to be turned by a belt chain 53 that is passed over a gear 54. The gear 54 is secured onto the end of a shaft 56 that is turned by a spin motor 55 of the motor assembly 16. The spin motor 55, as shown, connects at its side to a right angle mount 57 that is secured across its lower end to a foot 58, the foot 58, as shown in FIG. 1, is located adjacent to but is not connected to the carousel plate 14. So arranged, in practice, the mold holder 11 located on carousel plate 14, is turned into alignment with the motor assembly 16 and resinous material dispenser 15, and has the belt chain 53 connected around its gears 52 and 54, as shown. The motor assembly 16 is then operated, spinning the support plate 20 with the mold 17 thereon. Thereafter, the chain belt 53 is released and the carousel 14 can then be turned to align a following mold holder 11 for connection to the motor assembly 16, as described, to turn its support plate 20.

Alternatively, another arrangement for linking the respective motor 55 output shaft to turn the support plate 20 can be provided within the scope of this disclosure. Also, within the scope of this disclosure, a separate motor assembly 16 can be provided for each mold holder 11 that is connected to provide for spinning the mold support plate 20 through pulleys, slave wheels, or the like, not shown, within the scope of this disclosure, for imparting a centrifugal force into the mold 17 so as to distribute the resinous material throughout its mold cavity, as set out below.

Figure 4:
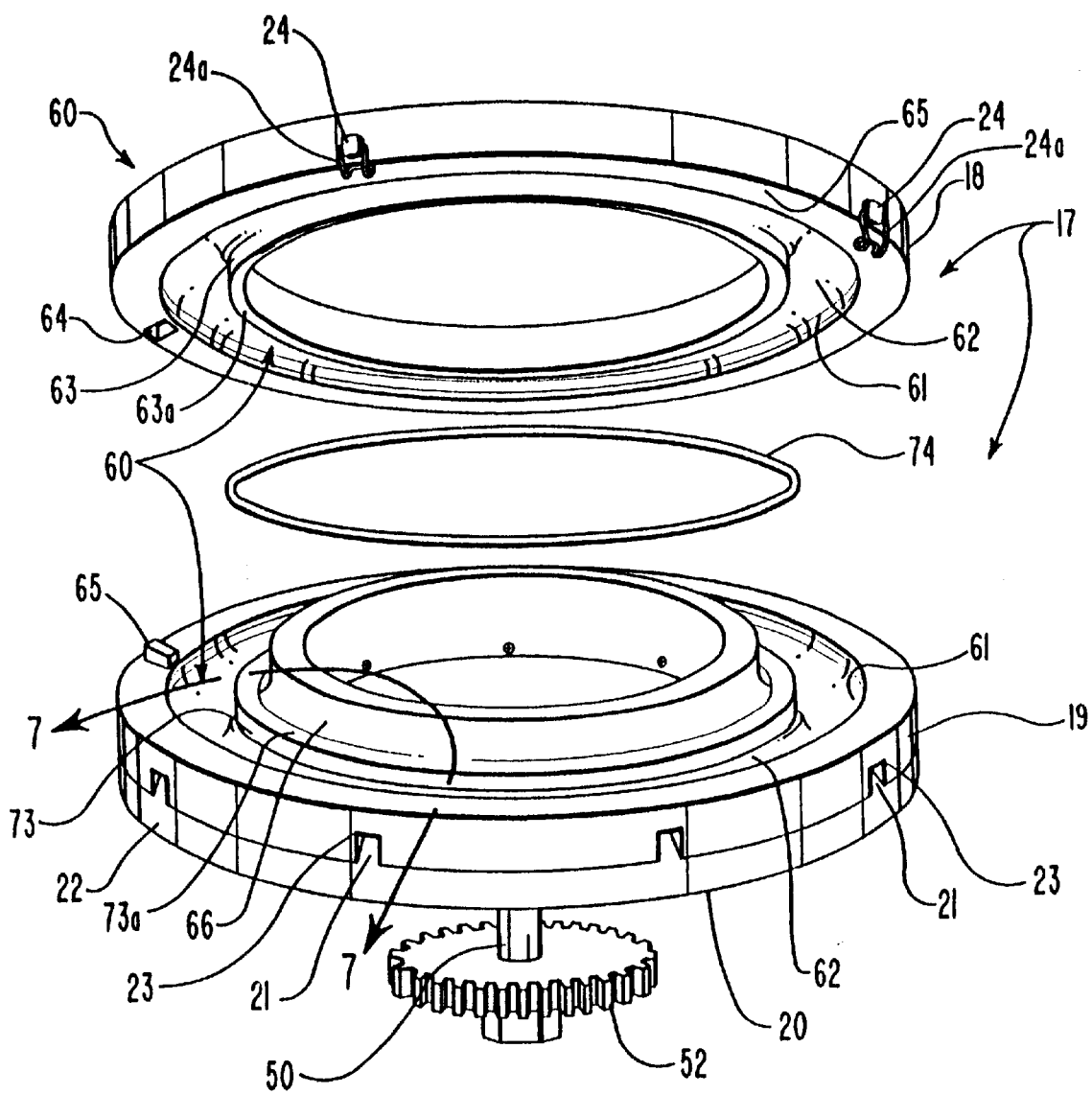
FIG. 4 is an exploded prospective view from the front of the apparatus of FIG. 1 showing both mold halves separated and showing a continuous tire cord formed from a continuous wire formed into a hoop and positioned in the mold.
Figure 6A:
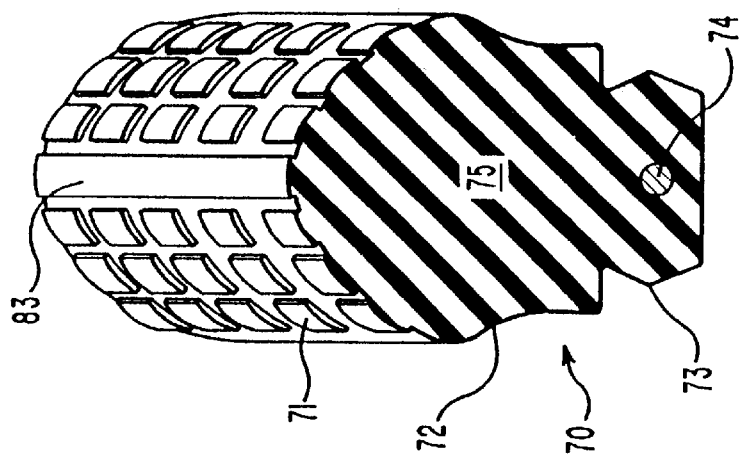
FIG. 6A is an enlarged section of the bicycle tire of FIG. 6, showing the tire tread.

The mold 17, as shown best in FIGS. 3, 4, and 7, and in expanded cross section in FIG. 5, includes the top mold section or half 18 and bottom mold section or half 19, that are arranged to be clamped together by operation of the clamping assembly 13, as set out above, with the hooks 24 ends 24a fitting into slots 23. So connected, a mold cavity 60, as shown in FIGS. 4, 5, and 7, is formed between the opposing mold sections or halves. Which mold cavity has the shape of the item to be formed in a molding process, that is shown in FIGS. 6 and 6A, as a bicycle tire 70 having a tread.

The mold 17 top and bottom sections 18 and 19 are individually formed from a suitable material, such as polyurethane, epoxy, silicone, polyester reinforced resins, or of a metal, such as aluminum, steel, or the like. For molding the bicycle tire 70, the mold top and bottom halves 18 and 19 cavity 60 each have a circular partial forward or tread section 61, a side wall 62 and a back or bead circular inner tread, and is arranged to receive a continuous wire 74 approximately centered in the tire bead and maintained therein by a magnetic latch arranged in the mold cavity 60, or like arrangement. So arranged, shown in FIGS. 5 and 6, a tread 71 of the bicycle tire is formed by the mold tread section 61, with a tire side wall 72 formed by the mold wall 62 and a tire bead is formed by the upper mold circular wall flange 63 and lower mold half circular inner wall 73.

To provide for fitting the mold 17 top and bottom sections or halves 18 and 19 together, in exact registry, opposing holes 64 and flanges 65 are provided in the opposing surfaces of the mold sections or halves 18 and 19 that are to fit together as the mold halves are brought together during coupling to provide for exactly aligning and registry of the mold sections or halves to form the mold 17. Prior to the mold 17 closing, as shown in FIG. 4, and within the bicycle tire 70 shown in FIGS. 5 and 6, a continuous wire 74 is preferably positioned that is preferably formed from steel, to have a diameter of from 0.037 to 0.063 inches, with, in practice, a diameter of 0.048 inches having been used. The wire has had its ends lap or butt welded together, or is otherwise formed into a wire loop, and is positioned in the mold, proximate to the circular inner flange 63, as by positioning it onto a magnetic latch, or the like, maintained within the mold cavity 66, the wire 74 to serve as a tension retaining member. Of course, within the scope of this disclosure, more than the single continuous wire 74 can be so used, as needed to reinforce and stabilize the tire bead. So arranged, when a bicycle tire is formed in mold cavity 60, the wire 74 will be encapsulated in the bicycle tire 70 tire bead and in that molding, and additionally a pseudo valve can also be formed in the molded tire, as desired.

Figure 6:
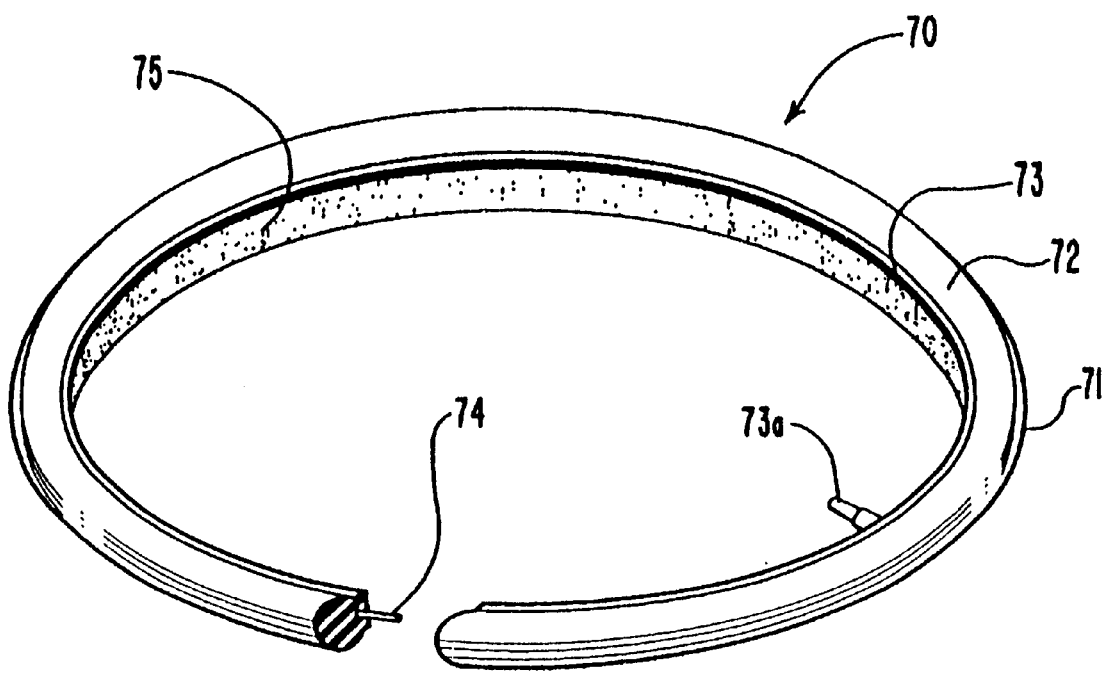
FIG. 6 is a perspective view of a bicycle tire produced in the apparatus of FIG. 1 in a practice of the method of the invention, with the tire shown as having been partially cut away to show a cross sectional view thereof and with a continuous wire shown encased in the tire bead area.

Unique to the invention, as set out above and as shown in FIGS. 5 and 6, an annular trough 66 is formed by an upstanding wall 67 that curves at 68 into the mold bottom section or half. The annular trough 66 is arranged to be at a uniform radial distance from the mold hub and is immediately adjacent to the bottom mold section or half 19 circular inner wall 73. Alternatively, the annular trough 66 may be formed with a stand pipe, not shown, to be attached to the mold bottom section or half 19. Preferably, as shown in FIG. 7, the annular trough 66 is formed within the mold bottom section or half 19. The annular trough 66 is formed to have a volume to accommodate a full charge of the resinous material that is sufficient to form one item in the mold 17 cavity 60. An example of such charge is set out below relative to a practice of the method of the invention for forming bicycle tire 70. The single continuous annular trough 66 opens into the mold cavity 60, as shown in FIG. 5, either through an annular opening 68 that is formed between opposing flat end surfaces 63a and 73a of the upper mold half circular inner wall 63 and lower mold half circular inner wall 73, as shown also in FIG. 5, or alternatively, a number of spaced ports 68a can be formed at intervals around the mold lower half 19 that open into the annular trough 66 to distribute the resinous material into the mold cavity, as shown in FIG. 7. Additionally, the annular trough 66 may be cupped across a lower end, as shown at 69, for retaining resinous material, so as to insure the mold cavity is filled, or, as needed, for passage into the mold cavity on initial turning, or, within the scope of this disclosure, the annular trough 66 bottom can be flat and align with the bottom of passage 68 or each of the ports 68a within the scope of this disclosure. Also, it should be understood, a plurality of individual or interconnected trough sections, not shown, can be arranged at equal spaced intervals around the mold cavity as an alternative to the single continuous annular trough 66, as shown, which trough sections can be formed in the bottom mold section or half 19, and all open into the mold cavity, functioning like the annular trough 66 as described above.

While the resinous material can be mixed manually and poured by an operator, not shown, into the annular trough 66 and thereafter the mold 17, can be spun up by operation of the drive motor assembly 16, the resinous material charging process is preferably automated. An example of such an automated process, is shown in FIG. 1, with, when the mold 17 closed, the annular trough 66 is filled from a nozzle 76 that is connected to ends of lines 82a and 82b that are fed resinous materials from tanks 81a and 81b maintained in a housing 80 of the resinous material dispenser 15. The respective resinous materials, identified as A and B, respectively, as set out below, are selected to provide, when combined together in the mold 17 and/or annular trough 66, for a delay in a beginning of a set up period that is a sufficient period of time, in seconds for the resinous material to clear the annular trough and travel into mold cavity 60. The mold 17 is then spun to its design speed, applying centrifugal force to the liquid resinous material, so as to throw it into and fully fill the mold 17, prior to the resinous material fully setting up.

To facilitate moving the nozzle 76 away from the mold 17 prior to its being spun up, a pivoting arm arrangement is provided where the nozzle 76 is attached through a pivot 76a to the end of a straight arm 77 that, in turn, connects on its opposite end through a pivot 78 to an end of a straight support arm 79 whose opposite end is secured to a top surface of the housing 80. The respective pivots 76a and 78 are preferably spring biased to elevate that pivoting arm and connected nozzle 76 away from the mold. Accordingly, in practice, an operator can manually pull the straight arm 77 downwardly to fit the nozzle 76 open end into the trough, or the like. The liquid resinous material A and B is moved through lines 82a and 82b for mixing in the nozzle with the mixed materials then passing into the annular trough 66. Whereafter, upon release of the nozzle 76 or straight arm 77, the nozzle will move upwardly away from the mold. Of course, within the scope of this disclosure, a movable arm, pulley arrangement, or the like, not shown, can be connected to provide for moving the straight arm appropriately to position the nozzle 76 end in the annular trough 66 to dispense a measured flow of the liquid resinous material therethrough as an automated operation. Which arrangement, it should be understood, should be considered to be within the scope of this disclosure.

As shown in FIG. 5, the annular trough 66 upstanding back wall 67 is positioned to contain and direct the flow of resinous liquid therealong, with the annular trough 66 preferably located immediately adjacent to the mold 17 bottom section or half 19 cavity circular inner wall 73. The positioning of the annular trough 66 immediately adjacent to the mold 17 cavity allows for the liquid low viscosity/polyurethane mixture to flow freely outwardly through annular opening 68 or ports 68a into the cavity of the mold 17 before and when the mold is spun. In practice, the flow of resinous materials is metered and delivered to the molding station by conventional multicomponent mixing and blending machines that are well known in the art.

A mold holder 11 that includes a clamping assembly 13 and support base 12 like that shown and described in U.S. Pat. Nos. 4,855,096 and 4,943,223 can also be utilized for the invention, as could other mold holders as are well known in the art within the scope of this disclosure. As set out above, the mold holder 11 can be arranged as a molding station on carousel plate 14 for movement to engage a drive motor assembly 16, or can be fixed, and a drive train from the motor assembly 16 to turn the support plate 20 can involve gearing, pulleys and a belt, slave wheels, or the like. In practice the support plate 20 is turned at a predetermined speed in rounds per minute (RPM), turning the mold 17 at speeds of from fifty (50) to five hundred (500) RPM. Additionally, various positioning devices and/or gimbling devices as are well know can be utilized with the invention to provide for balancing of the molds 17 during spinning.

Unlike earlier spin molding technology, the mold sections or halves 18 and 19 of the invention are preferably formed with at least one opposing hole 64 and 65 flange, the flange to slide into the hole, seating the mold halves together, forming mold 17, without a necessity to align and fit pins, or the like, as extend from one mold half into holes formed in mold half as have been utilized in earlier configurations. The mold 17 is manufactured to incorporate a desired tread 71 such as "Talons", "Claws", or other design, that is formed on the radially outermost surfaces of the partial back members 61 of each mold section or half, and, preferably, a centerline rib 83, shown in FIG. 6A, will be included in such tread design to provide for low rolling resistance.

In practice, the assembled mold 17 is placed onto the support plate 20 and the clamping assembly 13 is activated to apply a predetermined pressure to the mold 17 that rests upon the support plate. The nozzle 76 is positioned over the annular trough 66, between the mold section or half 19 inner circumference and upstanding wall 67, and a predetermined polyurethane mixture is discharged directly therethrough into the annular trough 66. Thereafter, the low viscosity chemical mixture quickly slide under the urgings of gravity into the trough for passage outwardly into the entry area of the mold 17. The drive motor assembly 16 is then operated to spin the support plate 20 with the mold 17 maintained thereon. An immediate centrifugal force is thereby applied to mold 17 to effect the liquid polyurethane materials and evenly distribute them throughout the mold cavity 60, insuring that the liquid polyurethane that is now in a foam state will react and fully fill the mold cavity.

After the item has been formed and cured in the mold 17 cavity 60, shown as a bicycle tire 70 in FIGS. 5 and 6, the mold 17 may be removed from the mold holder 11 and the mold sections or halves 18 and 19 separated, or the top mold half 18 can be pivoted away from the mold bottom half 19, as shown. The bicycle tire 70 is then pulled from the mold. The tire 70 that is so formed, as shown in FIGS. 5 and 6 and 6A, is a solid, microcellular bicycle tire, but may be a wheelchair tires, or the like.

The drive motor 55 as utilized in the spin motor assembly 16 may be a variable speed motor that can be used to selectively change the speed of rotation of the support plate 20 that maintains the mold 17 thereon. In practice it has been found that suitable tires can be produced using uniform rotational speeds of between one hundred and three hundred (100–300) RPM.

In practicing the method of the invention a usual polyurethane foam material that includes polyisocyanates and polyols is provided in amounts that are sufficient to fill the mold and fully react therein. As will be readily determined by one of ordinary skill in the art of preparation of polyurethane experiments and knowledgeable in the degree of required strength a resultant polymer should have to maintain its structure during a centrifugal casting process taking into account, from their experimentation, the forces as are anticipated, to determine the ranges of weights of materials for a range of volumes of water as are required to obtain a casting having characteristics that are suitable for a specific application. The preferred mixture will have water of a volume of from twenty five one hundredths (0.25) to two percent of the weight of the polyurethane mixture, and will preferably further include a blowing agent, such as a silicone surfactant, that will be capable of producing carbon dioxide gas to assist in a lowering of the density of the mixture that is attributable to gas in the mixture after it has set up. Such selected materials, are identified as contained in containers A and B in housing 80 of FIG. 1. However, it should be understood, the polyurethane materials as are selected are to provide, when mixed in the nozzle 76 after passage through lines 82a and 82b, a time delay of from 1 to 5 seconds prior to reacting together and a beginning of the curing process. The combined mixture is thereby allowed to fully travel into the annular trough 66 and into the mold cavity 60 to receive centrifugal forces exerted thereon when the support plate 20 is spun. Preferably, the mix will begin the curing process just as the support plate 20 and mold 17 are spun, with the mix thereby traveling into and throughout the mold cavity 60 as it is foaming so as to fully fill that mold cavity. Accordingly, with the initiation of centrifugal forces, the resinous material, will rapidly travel throughout the mold cavity 60 and provide for a build up in viscosity to deposit a thick mass against the mold tread section 61. The mold tread section 61, in forming the tread, receives a thick mass of material that compacts into a thick skin and is wrapped around approximately an outer one third of the tire, with the remainder of the foam mixture extending therefrom inwardly to form a uniform density core. With the present process, the resinous mixture foam enters into the mold cavity as a liquid and, at the point in time when centrifugal forces are introduced therein, the mixture reaction will begin. The invention therefore synchronizes mold spinning to the time the resinous mixture begins to react. So arranged, a resultant article, such as the bicycle tire 70, will have essentially a void and/or blemish free surface and includes a foam core, that varies uniformly in density, from a greater density adjacent to the tread with a progressively lesser density to the tire bead, providing a tire having a design ride quality, spring rate and appropriate roll resistance. Further, with a utilization of selected mold rotation speeds, a more or less dense finished item can be produced that is suitable for a number of applications.

While a preferred embodiment of our invention in a molding apparatus, a process for its use, and an item produced by the process, have been shown and described herein it should be understood that the present disclosure is made by way of example only and that the invention is suitable for production of other items, as for example, shoe soles, automotive applications such as steering wheels, and the like, and that variations and changes are possible to the described apparatus and method for its use without departing from the subject matter coming within the scope of the following claims, and a reasonable equivalency thereof, which claims we regard as our invention.

We claim:

1. A method for forming a spin cast item comprising the steps of, mixing together polyurethane materials comprising polyisocyanates with a volume of water selected as a molecule chain extender to provide a time delay before the liquid polyurethane material begin to set up of from 1 to 5 seconds; for a mold having an interior cavity formed to have the shape of an item to be cast, with said mold maintained on a support plate that is journaled to a frame to be axially spun to a speed of between fifty (50) to five hundred (500) RPM, passing the polyurethane materials into an annular trough that is located on or within said mold and is immediately adjacent to and is open around its circumference into the mold cavity to provide an even distribution of polyurethane materials into said mold cavity at said mold cavity inner circumference; prior to the polyurethane materials passed into said annular trough beginning to cure and form a foam, spinning the support plate to introduce centrifugal forces into said polyurethane materials to distribute them from said annular trough evenly in said mold cavity wherein the curing process beings with the polyurethane materials forming a foam that uniformly fills the cavity, and, with continued spinning, the centrifugal forces to uniformly compact said foam at the cavity walls, producing a uniform non-porous skin around a cellular inner core of an item.

2. The method as recited in claim 1, wherein the mold is formed as a continuous horizontal cavity, that has the shape of a tire with spaced inner and outer circumferences that are equidistant from a common radius, into top and bottom sections, with the annular trough maintained to open at equal spaced intervals therearound into said bottom said bottom section at the cavity inner circumference; and said annular trough receives the liquid polyurethane materials through an open top area.

3. The method as recited in claim 2, wherein the water comprises from twenty five one hundredths (0.25) to two (2) percent by weight of the polyurethane materials.

4. The method as recited in claim 2, wherein the constituents of the polyurethane materials are passed into and mixed within a nozzle that is positionable over an open end of the open top of the annular trough to pass said polyurethane materials in a liquid state through said open top to flow into to a uniform level in said annular trough.

5. The method as recited in claim 2, further including providing at least one section of steel wire that has been connected at its ends into a loop and is positioned in the mold interior cavity prior to introduction of the polyurethane materials therein so as to be surrounded by and encapsulated in the polyurethane foam at the tire bead.

6. The method as recited in claim 1, wherein a blowing agent is included with the polyisocyanates and water as components of the polyurethane materials for producing carbon dioxide gas to assist in a lowering of the density of the cured polyurethane foam.

* * * * *